Jan. 22, 1963  W. REINECKE  3,074,255
UNIVERSAL JOINT
Filed Dec. 19, 1960

United States Patent Office 3,074,255
Patented Jan. 22, 1963

3,074,255
UNIVERSAL JOINT
Walter Reinecke, Essen, Germany, assignor to Gelenkwellenbau G.m.b.H., Essen, Germany
Filed Dec. 19, 1960, Ser. No. 76,731
Claims priority, application Germany Dec. 29, 1959
3 Claims. (64—17)

The present invention relates to a universal joint the studs or pivots of which are by means of roller bodies rotatable relative to the forks of the joint.

With the heretofore known embodiments of universal joints, the roller bodies were mounted directly between the studs or pivots and the bearing bushing serving as race bushing. Such arrangements have the drawback that the running or race surfaces had to be designed particularly carefully, and furthermore it was necessary to provide additional bearing discs in order to maintain the axial position of the roller bodies.

It is, therefore, an object of the present invention to provide a universal joint which will overcome the above mentioned drawbacks.

It is another object of this invention to provide a universal joint of the above mentioned general character, which will permit the employment of anti-friction bearings without cage.

It is also an object of this invention to provide a universal joint with anti-friction bearing means in such a way that a particularly precise adjustment of the universal joint will be possible.

These and other objects and advantages of the invention will appear more clearly from the following specification in connection with the accompanying drawing, in which.

Figure 1:
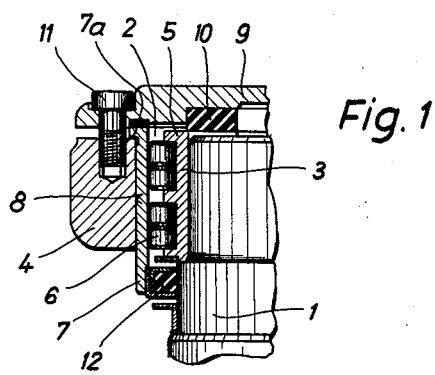
FIG. 1 illustrates a universal joint according to the present invention with a bearing lid screwed thereonto.

The universal joint according to the present invention is characterized primarily in that the roller bodies are mounted on an inner race ring pressed upon each stud or pivot and securing the bearing bodies against axial displacement by means of shoulders provided on said race ring. With such an arrangement, any well-known anti-friction bearings without cage may be employed. Preferably, roller bearings are used.

According to a particularly practical embodiment of the invention, an outer race ring for the roller bodies is fitted into the bore of the fork of the joint. In this way, the bearing and thus the entire joint may be radially adjusted relative to the fork of the joint by a bearing lid acting in radial direction against the outer race ring and provided with a thrust bearing for the studs or pivots, said bearing lid being adapted to be screwed onto the fork of the joint. In this way, a particularly precise adjustment of the universal joint will be possible.

However, it is also possible to design the bearing bushing, which is fitted in a manner known per se, in the bore of the fork of the joint as outer race ring for the roller bodies. At any rate, it is, however, necessary in this instance to do without radial adjustability by the above mentioned bearing lid.

Referring now to the drawing in detail, an anti-friction bearing 2 is mounted on pivot 1 for journalling the pivot relative to the fork 4 of the joint. The bearing 2 comprises an inner race ring 3 on which rollers 6 are movable which by means of shoulders 5 provided on the race ring 3 are secured against axial displacement.

According to the embodiment of FIG. 1, there is additionally provided an outer race ring 7 which is fitted into the bore 8 of the fork 4 of the joint. The upper end of said outer race ring 7 is provided with a shoulder 7a engaging the fork 4 of the joint. Furthermore, according to FIG. 1, the pivot 1 and bearing 2 are covered up by means of a bearing lid 9 having arranged therein in a manner known per se a thrust bearing 10 for pivot 1. The bearing lid 9 is so designed that it acts in radial direction against the shoulder 7a of the outer race ring 7 whereby a radial displacement of pivot 1 with bearing 2 will be possible. The bearing lid 9 is connected to fork 4 by means of screws 11. Bearing 2 is by means of any suitable seal 12 sealed with regard to the central portion of the universal joint.

Figure 2:
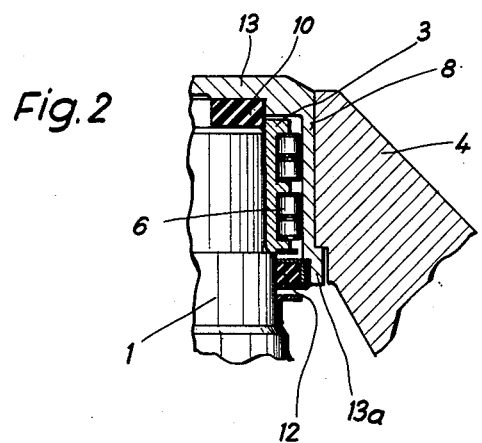
FIG. 2 illustrates a universal joint according to the invention with a bearing bushing inserted into the fork of the joint.

According to the embodiment of FIG. 2, the bearing 2 is arranged in a bearing bushing 13 which simultaneously serves as outer race ring for the rollers. Also in this bearing bushing 13 there is provided a thrust bearing 10. The bushing 13 is by means of a shoulder-shaped extension 13a secured in fork 4 against axial displacement.

It is, of course, to be understood that the present invention is, by no means, limited to the particular constructions shown in the drawings but also comprises any modifications within the scope of the appended claims.

What I claim is:

1. In a universal joint having a fork, and trunnion means rotatable relative to said fork: inner race ring means directly mounted on said trunnion means between the latter and said fork and composed of a single bushing, and a plurality of sets of antifriction bearing bodies mounted on said race ring means between the latter and said fork, said sets being coaxially arranged on said inner race ring means, each of said sets comprising a plurality of cylindrical rollers engaging said race ring means, said race ring means having radially outwardly extending shoulders spaced from each other in axial direction of said race ring means and confining said sets therebetween thereby substantially preventing said antifriction bearing bodies from being displaced in axial direction of said race ring means and relative thereto.

2. In a universal joint having a fork, and trunnion rotatable relative to said fork: inner race ring means mounted on said trunnion means and arranged between the latter and said fork, said race ring means having radially outwardly extending shoulders spaced from each other in axial direction of said race ring means, anti-friction bearing means mounted on said race ring means between said shoulders and between said race ring means and said fork, outer race ring means slidably mounted in said fork for said anti-friction bearing means, and lid means including a thrust bearing for said trunnion means and adjustably connected to said fork for selectively adjusting said anti-friction bearing means.

3. In a universal joint having a fork with a bore, and trunnion means mounted in said bore and rotatable relative to said fork: inner race ring means mounted on and engaging said trunnion means and arranged between the latter and said fork, said race ring means having radially outwardly extending shoulders spaced from each other in axial direction of said race ring means, rotatable anti-friction bearing bodies mounted on said race ring means between said shoulders and between said race ring means and said fork whereby said anti-friction bearing bodies are prevented from being displaced in axial direction of said race ring means, a cup having a bottom in axial alignment with said trunnion means and having a cylindrical outer surface mounted in said bore of said fork and arranged between the latter and said anti-friction bearing bodies, said cup also having an inner cylindrical surface forming the outer race ring means for said anti-friction bearing bodies, the bottom of said cup being spaced from said trunnion means in axial direction of the latter, and thrust bearing means interposed between said bottom of said cup and the respective adjacent end face of said trunnion means.

References Cited in the file of this patent

UNITED STATES PATENTS

| | | |
|---|---|---|
| 1,943,814 | Cutting | Jan. 16, 1934 |
| 2,026,997 | Rice | Jan. 7, 1936 |
| 2,589,560 | Lloyd | Mar. 18, 1952 |

FOREIGN PATENTS

| | | |
|---|---|---|
| 525,771 | France | June 16, 1921 |
| 885,904 | France | June 15, 1943 |